United States Patent [19]
Yamamoto et al.

[11] Patent Number: 5,399,987
[45] Date of Patent: Mar. 21, 1995

[54] BI-PHASE SHIFT KEYING SIGNAL DEMODULATION CIRCUIT FOR RDS RECEIVER

[75] Inventors: Yuji Yamamoto; Kiichiro Akiyama, both of Kawagoe, Japan

[73] Assignee: Pioneer Electronic Corporation, Tokyo, Japan

[21] Appl. No.: 171,020

[22] Filed: Dec. 21, 1993

[30] Foreign Application Priority Data

Dec. 28, 1992 [JP] Japan ................................ 4-348572

[51] Int. Cl.$^6$ ............................................ H04L 27/22
[52] U.S. Cl. ................... 329/306; 329/310; 375/80; 375/87
[58] Field of Search ............... 329/304, 306, 307, 310; 375/80, 81, 83, 87

[56] References Cited

U.S. PATENT DOCUMENTS 5,150,070  9/1992  Rimaldi et al. .................. 375/87 X
5,175,507 12/1992  Roither ............................. 329/304

Primary Examiner—Siegfried H. Grimm
Attorney, Agent, or Firm—Kane, Dalsimer, Sullivan, Kurucz, Levy, Eisele and Richard

[57] ABSTRACT

A bi-phase shift keying signal demodulation circuit for an RDS receiver receives RDS modulation signal and reproduces RDS data from the RDS modulation signal. The RDS modulation signal is produced by modulating a sub-carrier by a signal modulated by a bi-phase shift keying modulation using the RDS data. The bi-phase shift keying signal demodulation circuit includes: a clock reproducing unit for reproducing an RDS clock signal from the RDS modulation signal; a multiplying unit for operating a logical product of the RDS modulation signal and the RDS clock signal; a phase comparison unit for comparing the phase of the output signal of the multiplying unit with a synchronizing signal of the sub-carrier and producing a phase comparison signal; a pulse converting unit for converting pulses in the phase comparison signal into pulses of higher frequency than that of the phase comparison signal; and an integration/reset unit for monitoring the converted phase comparison signal at every period of the RDS clock signal for phase judgement and producing a bi-phase shift keying demodulation signal from which the sub-carrier component is removed.

10 Claims, 11 Drawing Sheets

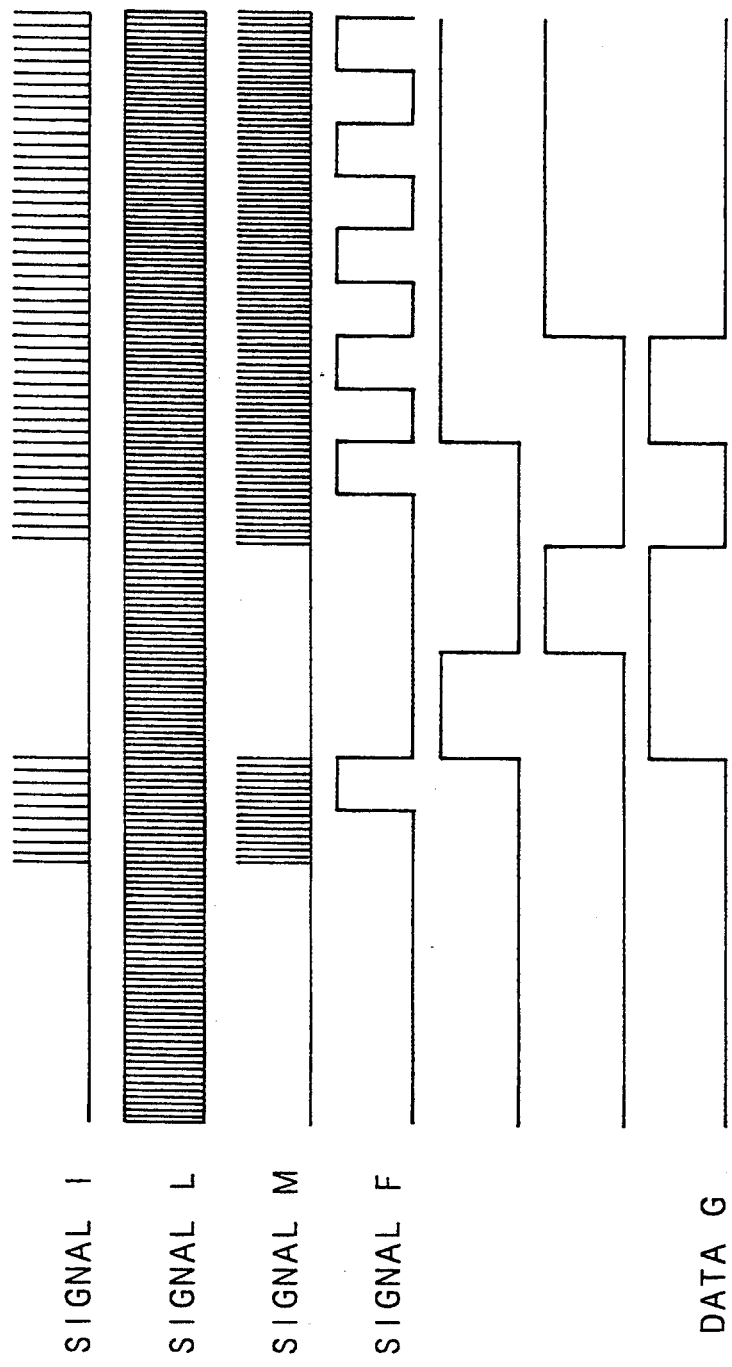

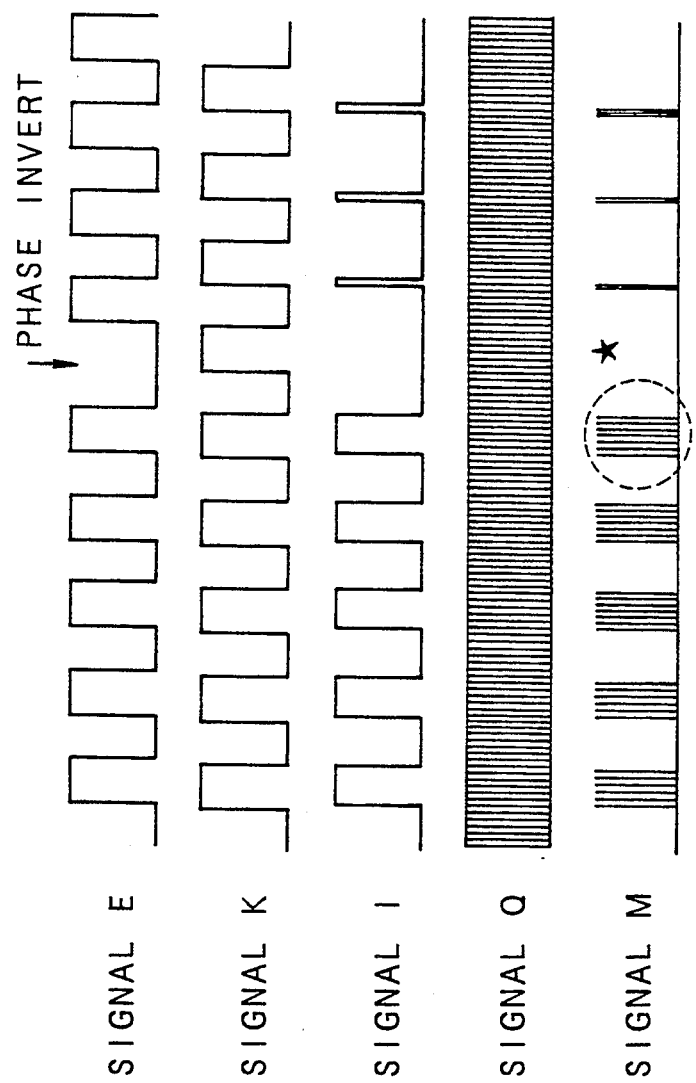

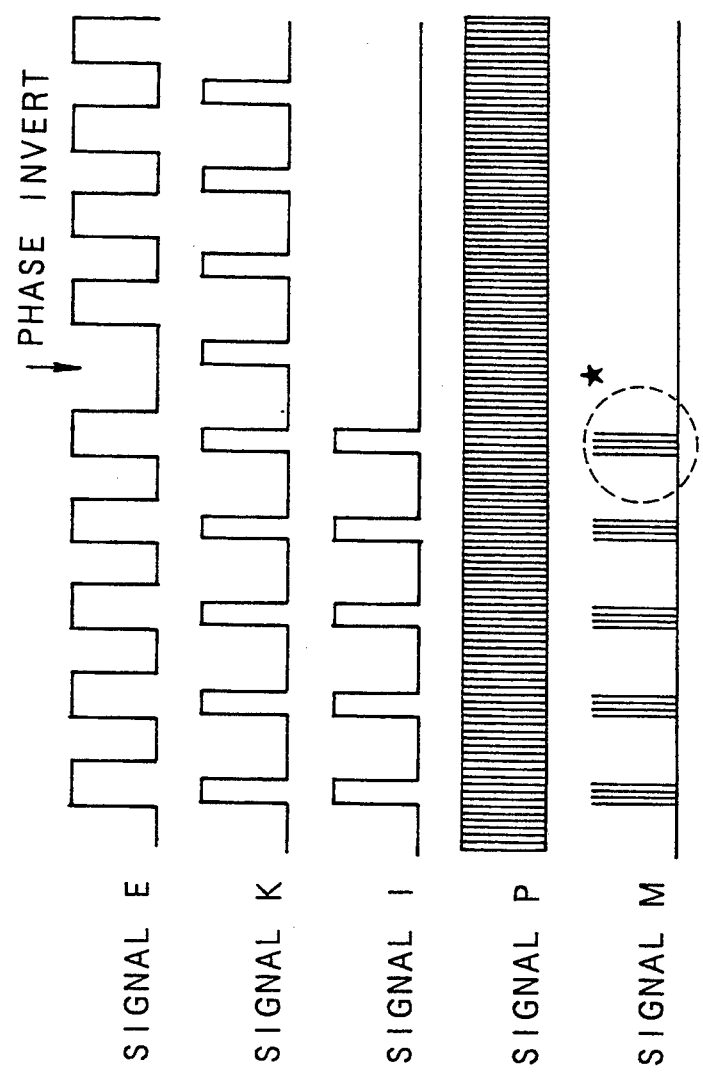

BI-PHASE SHIFT KEYING SIGNAL DEMODULATION CIRCUIT FOR RDS RECEIVER

BACKGROUND OF THE INVENTION

1. Field of the Invention

This invention relates to a bi-phase shift keying signal demodulation circuit for an RDS (Radio Data System) receiver which receives multiplexed data of RDS signals inclusive of digital messages such as information used for selection of broadcasting stations.

2. Description of the Prior Art

As a traffic information system for relieving a traffic snarl, there is known an ARI broadcasting system. In the ARI broadcasting system, a sub-carrier of 57 kHz is constantly multiplexed into an FM radio wave of a broadcasting station so as to identify the station which is broadcasting traffic information. In addition, in that system, a DK signal and a BK signal, obtained by amplitude-modulating the sub-carrier by predetermined frequencies, are multiplexed into the radio wave so as to provide information relating to a beginning or end of the traffic information, or a region in which traffic information is broadcasted.

As a similar system, there is known an RDS system in which digital data identifying broadcasting stations, etc., are multiplexed into an FM radio wave using a sub-carrier of 57 kHz. Data to be multiplexed in the RDS system is configured by a plurality of groups consisting of 104 bits data, and various messages mainly used for the selection of broadcasting station are standardized. The transmission rate of RDS data is 1.1875 kbit/sec, and RDS data is encoded by a differential encoding. Then, a clock signal of 1.1875 kHz is modulated by a bi-phase shift keying using the encoded data. Further, a sub-carrier of 57 kHz is modulated by a carrier suppressed amplitude modulation using modulated data of bi-phase shift keying. Double sideband (DSB) signals of the modulated data are multiplexed to audio data, and the multiplexed data is transmitted. A sub-carrier of RDS data is designed so as to be in phase or in orthogonal phase (shifted by 90 degrees) with the third harmonic of a pilot signal (19 kHz) indicating a stereo broadcasting. When it is required to maintain coexistence of the ARI signal and the RDS modulated signal, the two signals are multiplexed so that the frequencies thereof are equal to each other and the phase relation of them becomes orthogonal with each other (shifted by 90 degrees).

RDS data is obtained by demodulating the RDS modulation signal according to the following manner. Firstly, the RDS modulation signal is extracted from an FM modulation signal using a band pass filter, and a bi-phase shift keying signal is obtained from the extracted signal by a PLL (Phase Locked Loop) synchronization detection. Simultaneously, a synchronization signal of sub-carrier is also generated by the PLL synchronization detection. Then, an RDS clock signal is extracted from the bi-phase shift keying signal and the bi-phase shift keying signal is demodulated using the extracted RDS clock signal. Then, a synchronization detection circuit operates a logical product of the demodulated bi-phase shift keying signal and the synchronizing signal to produce a bi-phase shift keying signal. Then, the RDS data is decoded from the bi-phase shift keying signal by a differential decoding.

In the above described RDS receiver, when the phase relation between the synchronizing signal of the sub-carrier and the sub-carrier component of the bi-phase shift keying modulation signal is stable, the demodulation performance is kept stable. However, in the synchronizing detection, an error component due to jitter is produced when an intensity of the electric field in a received signal is weak. In addition, when an ARI signal is transmitted with an RDS signal, the PLL synchronizing detection circuit locks with the ARI signal whose degree of modulation is higher than that of the RDS signal. In this case, the error component due to jitter increases. As a result, the phase relation between the synchronizing signal and the sub-carrier component of the bi-phase shift keying modulation signal becomes unstable and the RDS data is reproduced erroneously.

SUMMARY OF THE INVENTION

It is an object of the present invention to provide a bi-phase shift keying signal demodulation circuit capable of stably demodulating bi-phase shift keying signals.

According to one aspect of the present invention, there is provided a bi-phase shift keying signal demodulation circuit for an RDS receiver which receives an RDS modulation signal and reproduces RDS data from the RDS modulation signal. The RDS modulation signal is produced by modulating a sub-carrier by a signal modulated by a bi-phase shift keying modulation using the RDS data. The bi-phase shift keying signal demodulation circuit includes: a clock reproducing unit for reproducing an RDS clock signal from the RDS modulation signal; a multiplying unit for operating a logical product of the RDS modulation signal and the RDS clock signal; a phase comparison unit for comparing phase of the output signal of the multiplying unit with a synchronizing signal of the sub-carrier and producing a phase comparison signal; a pulse converting unit for converting pulses in the phase comparison signal into pulses of higher frequency than that of the phase comparison signal; and an integration/reset unit for monitoring the converted phase comparison signal at every period of the RDS clock signal for phase judgement and producing a bi-phase shift keying demodulation signal from which the sub-carrier component is removed.

According to the above bi-phase shift keying signal demodulation circuit, the pulse converting unit converts the phase comparison signal into a signal having pulses of higher frequency. Therefore, the integration/reset unit can perform phase comparison precisely and the bi-phase shift keying signal from which the sub-carrier component is removed is obtained.

According to another aspect of the present invention, there is provided a bi-phase shift keying signal demodulation circuit for an RDS receiver which receives an RDS modulation signal and reproduces RDS data from the RDS modulation signal. The RDS modulation signal is produced by modulating a sub-carrier by a signal modulated by a bi-phase shift keying modulation using the RDS data. The bi-phase shift keying signal demodulation circuit includes: a clock reproducing unit for reproducing an RDS clock signal from the RDS modulation signal; a multiplying unit for operating a logical product of the RDS modulation signal and the RDS clock signal; a phase comparison unit for comparing phase of the output signal of the multiplying unit with a synchronizing signal of the sub-carrier and producing a phase comparison signal; a pulse width varying unit for varying pulse width of pulses in the phase comparison signal; and an integration/reset unit for monitoring the phase comparison signal output from the pulse width varying unit at every period of the RDS clock signal for phase judgement and producing a bi-phase shift keying demodulation signal from which the sub-carrier component is removed.

According to the above bi-phase shift keying signal demodulation circuit, the pulse width varying unit varies the pulse width of the synchronizing signal of the sub-carrier. Therefore, phase deviation between the sub-carrier component in the phase comparison signal and the synchronizing signal is corrected and an erroneous phase discrimination is avoided. As a result, the integration/reset unit can perform phase comparison precisely and the bi-phase shift keying signal from which the sub-carrier component is removed is obtained.

The nature, utility, and further features of this invention will be more clearly apparent from the following detailed description with respect to the preferred embodiment of the invention when read in conjunction with the accompanying drawings briefly described below.

BRIEF DESCRIPTION OF THE DRAWINGS

FIG. 9 is a timing chart showing a performance of the circuit shown in FIG. 8;

FIG. 10 is a timing chart showing another performance of the circuit shown in FIG. 8; and FIG. 11 is a timing chart showing still another performance of the circuit shown in FIG. 8.

DESCRIPTION OF THE PREFERRED EMBODIMENT

RDS Receiver

Before describing a preferred embodiment, the construction and performance of a general RDS receiver will be firstly described.

Figure 1:
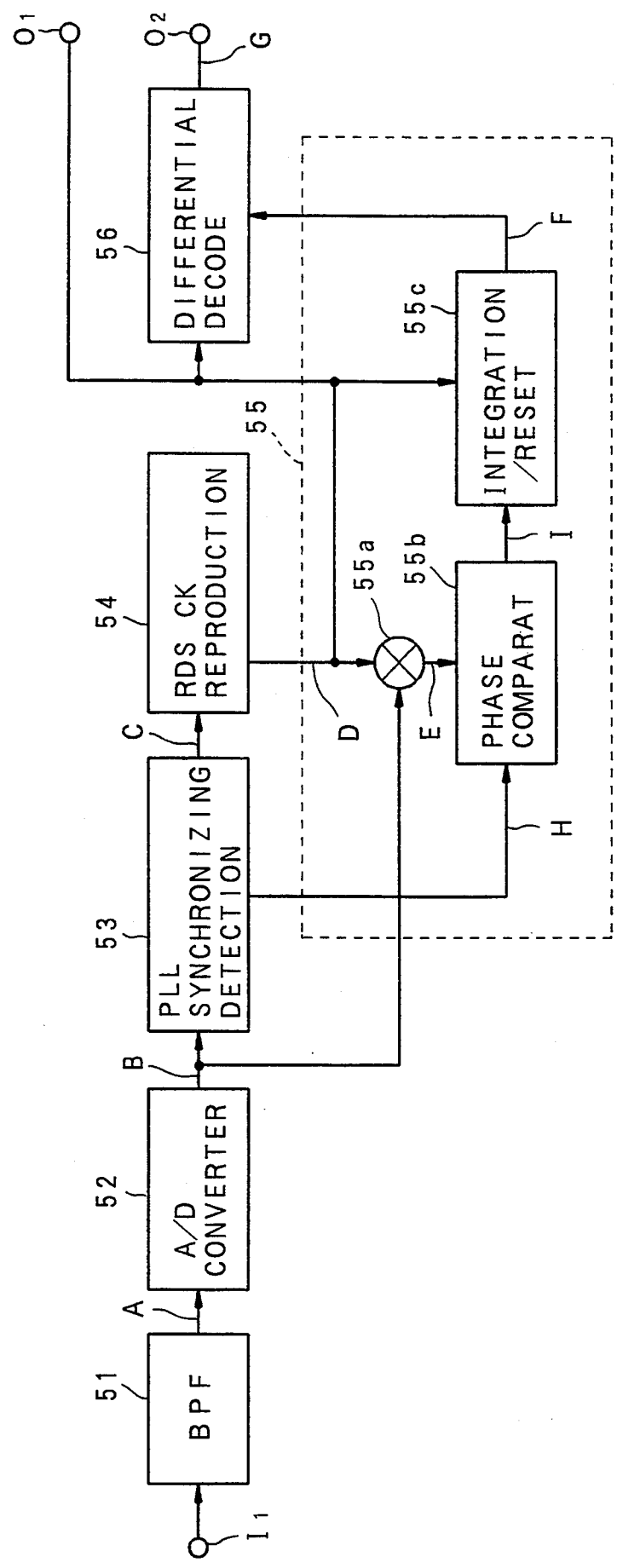
FIG. 1 is a block diagram showing an RDS signal demodulation circuit used in an RDS receiver.
Figure 2:
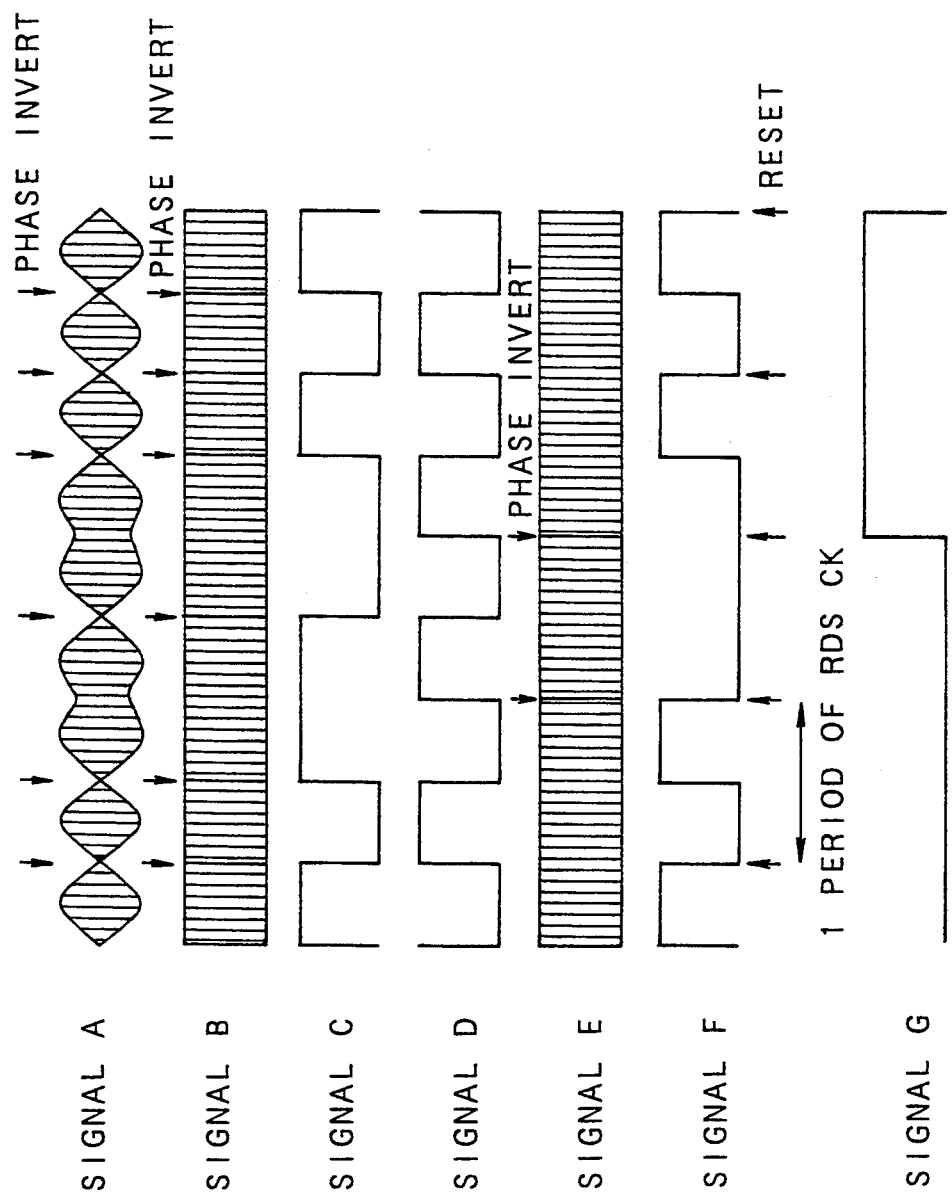
FIG. 2 is a timing chart showing waveforms of the respective signals in the RDS signal demodulation circuit shown in FIG. 1.

FIG. 1 shows a construction of an RDS signal demodulation circuit used in an RDS receiver for receiving an FM multiplexed data broadcasting (RDS), and FIG. 2 shows waveforms of respective signals in the RDS signal demodulation circuit shown in FIG. 1. As shown in FIG. 1, in the RDS signal demodulation circuit, an FM demodulation signal detected by an FM detector (not shown) is supplied to a BPF 51, and an RDS modulation signal A is extracted by the BPF 51. The RDS modulation signal A thus extracted is converted to be a digital signal in an A/D converter 52, and the digital signal B is supplied to a PLL synchronizing detection circuit 53 and a bi-phase shift keying signal demodulation circuit 55. A bi-phase shift keying signal C output from the PLL synchronizing detection circuit 53 is supplied to an RDS clock reproduction circuit 54. The RDS clock reproduction circuit 54 reproduces an RDS clock D and supplies it to the bi-phase shift keying signal demodulation circuit 55.

The bi-phase shift keying signal demodulation circuit 55 includes, as shown in FIG. 1, a multiplier 55a, a phase comparator 55b and an integration/reset circuit 55c. The multiplier 55a receives the A/D converted RDS modulation signal B and the RDS clock signal D, and generates a bi-phase shift keying modulation signal E. This bi-phase shift keying modulation signal E includes, as shown in FIG. 2, a sub-carrier component (57 kHz) of the RDS modulation signal. The sub-carrier component is synchronous with a synchronizing signal H of a sub-carrier produced by synchronizing detection of the PLL synchronizing detection circuit 53. The phase comparator 55b receives the synchronizing signal H and the bi-phase shift keying demodulation signal E, and produces and supplies a phase comparison signal I to the integration/reset circuit 55c. The bi-phase shift keying signal E has such a feature that the phase of the sub-carrier component thereof is inverted (i.e., shifted by 180 degrees) at the phase inversion points shown in FIG. 2. Accordingly, by comparing the phase of the bi-phase shift keying signal E with the phase of the synchronizing signal H, a period in which the two signals are in phase and a period in which the two signals are 180 degrees out of phase is discriminated. The integration/reset circuit 55c receives the phase comparison signal I and the RDS clock signal D, monitors the result of the phase comparison at every period of the RDS clock signal, and integrates the comparison result to judge the phase relation. In the judgement of the phase relation, the integration/reset circuit 55c outputs a high level signal having a pulse duration of a half of the RDS clock period when the two signals are in phase, and outputs a low level signal when the two signals are 180 degrees out of phase. Then, the integration/reset circuit 55c resets the output of the pulse just before the next period, and repeats the above phase relation judgement at every period of the RDS clock signal D. By this operation, the bi-phase shift keying demodulation signal F being divided for every period of the RDS clock signal D is output.

Figure 3:
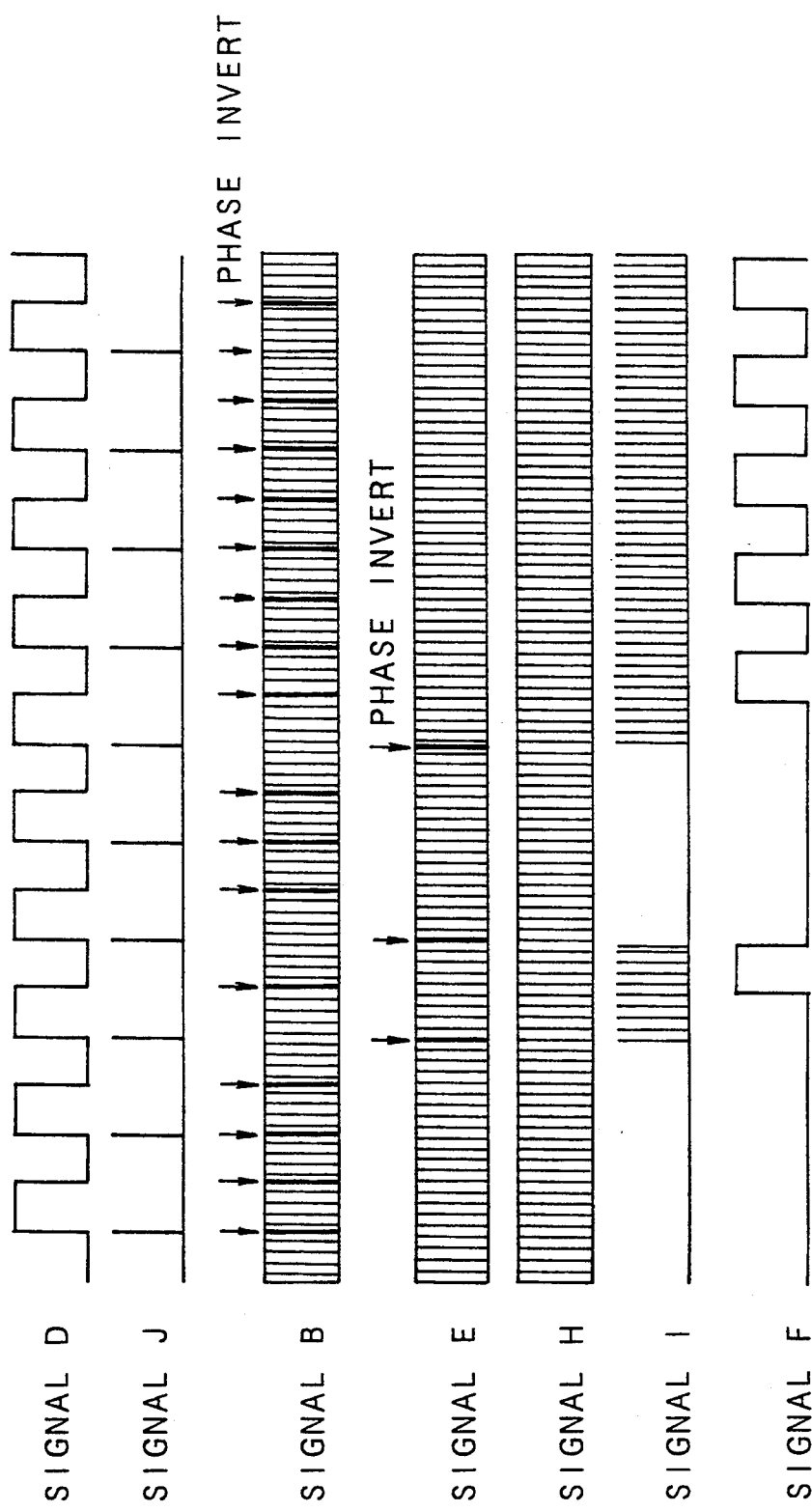
FIG. 3 is another timing chart showing waveforms of the respective signals in the bi-phase shift keying signal demodulation circuit shown in FIG. 1.
Figure 4:
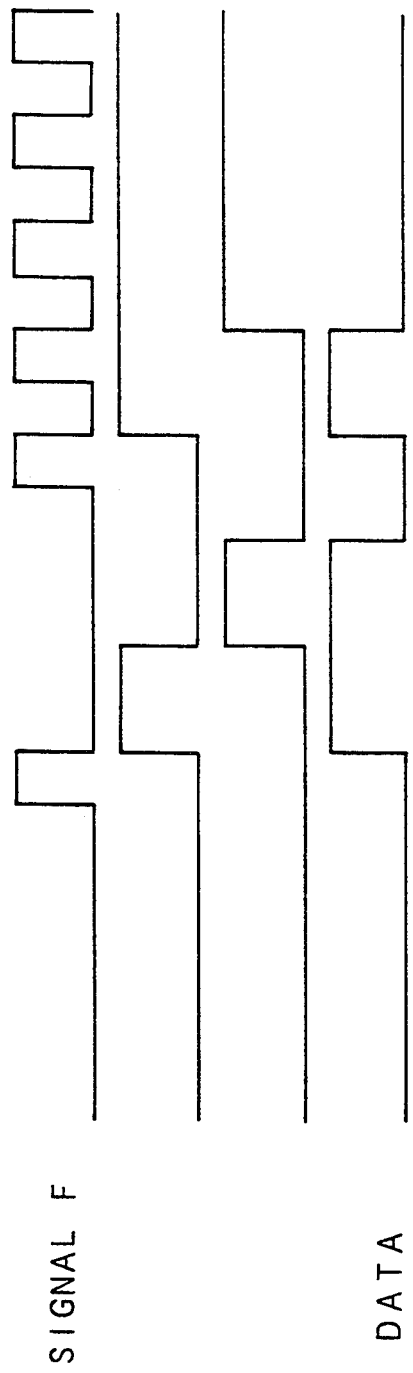
FIG. 4 is timing chart showing an operation of the differential decoding circuit shown in FIG. 1.

Next, the performance of the bi-phase shift keying circuit 55 will be described in more detail with reference to FIG. 3. The integration/reset circuit 55c produces a reset signal J from the RDS clock signal D so as to completely divide the bi-phase shift keying signal F for every period of the RDS clock signal D. As shown in FIG. 3, the phase of the sub-carrier component of the bi-phase shift keying signal E which is produced by multiplying the A/D converted RDS modulation signal B and the RDS clock signal D is inverted at the positions where the phase of the sub-carrier component of the RDS modulation signal B maintains the previous phase condition and is not inverted at the position where the phase of the sub-carrier component of the RDS modulation signal B is inverted. Accordingly, the bi-phase shift keying demodulation signal F excluding the sub-carrier component can be obtained if it is discriminated that the phase of the sub-carrier component of the bi-phase shift keying signal E is inverted or not. In view of this, the phase comparator 55b operates a logical product of the bi-phase shift keying signal E and the synchronizing signal H. As a result, the phase comparator 55b outputs, as the phase comparison signal I, the sub-carrier component when the two signals are in phase, and outputs the low level signal when the two signals are 180 degrees out of phase. The integration/reset circuit 55c counts the sub-carrier component of the phase comparison signal I for every period of the RDS clock signal, and produces a signal which maintains a high level during every later half period of the RDS clock signal. In this manner, the bi-phase shift keying demodulation signal F being completely divided for every period of the RDS clock signal D is output. The differential decode circuit 56 decodes, as shown in FIG. 4, the bi-phase shift keying demodulation signal F to reproduce the RDS data.

Figure 5A:
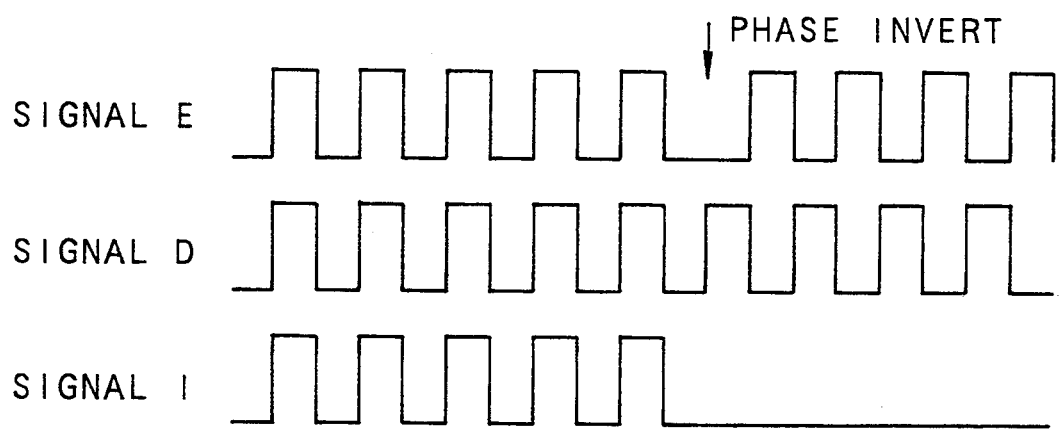
FIGS. 5A and 5B are timing charts showing performances of the circuit shown in FIG. 1.
Figure 5B:
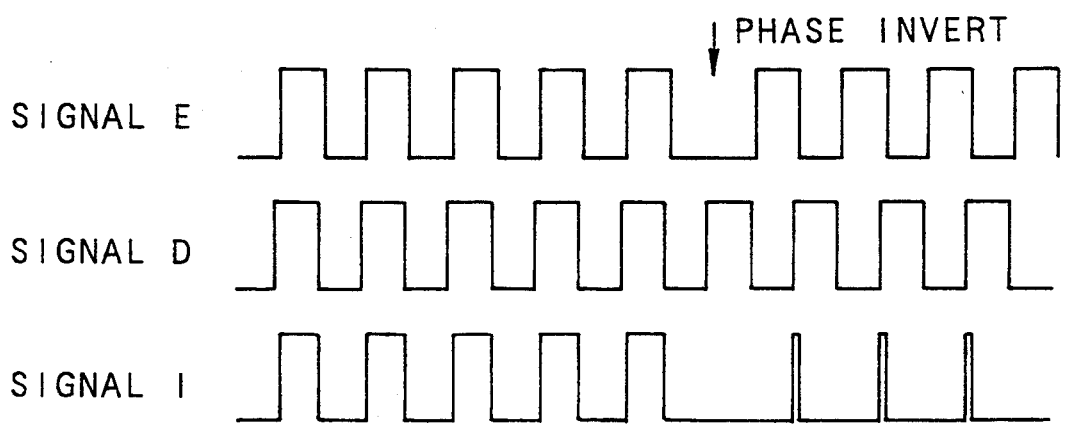

In the above descried RDS receiver, when the phase relation between the synchronizing signal of the sub-carrier and the sub-carrier component of the bi-phase shift keying modulation signal is stable, the demodulation performance is kept stable as shown in FIG. 5A. However, in the synchronizing detection, an error component due to jitter is produced when the intensity of the electric field in the received signal is weak. In addition, when an ARI signal is transmitted with an RDS signal, the PLL synchronizing detection circuit locks with the ARI signal whose degree of modulation is higher than that of the RDS signal. As a result, the phase relation between the bi-phase shift keying demodulation signal E and the synchronizing signal H becomes unstable, and the phase comparison signal I consists of pulses at period in which the phases of the two signals are 180 degrees out of phase due to the phase deviation, as shown in FIG. 5B. The integration/reset circuit 55c erroneously counts these pulses. Therefore, the output data includes error component and the RDS data is reproduced erroneously.

Embodiment

Next, a preferred embodiment of the present invention will be described with reference to the accompanying drawings.

Figure 6:
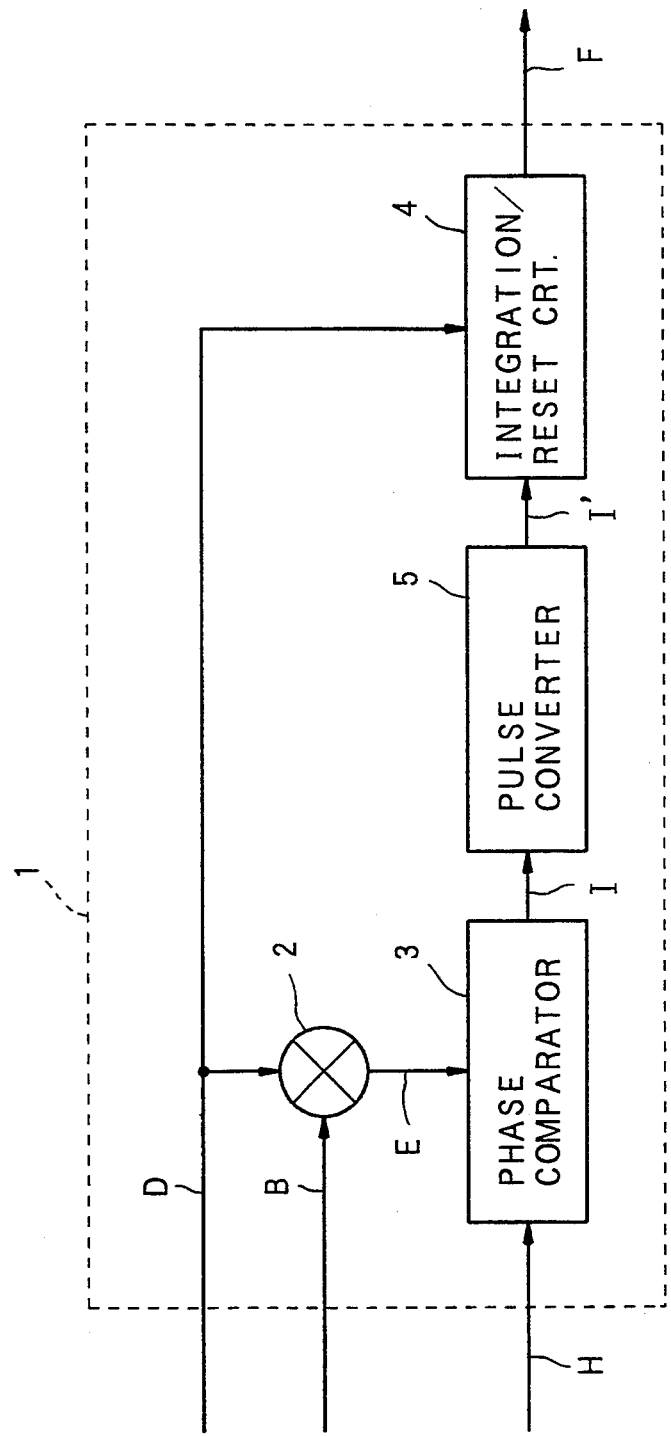
FIG. 6 is a diagram showing a concept of the present invention.
Figure 7:
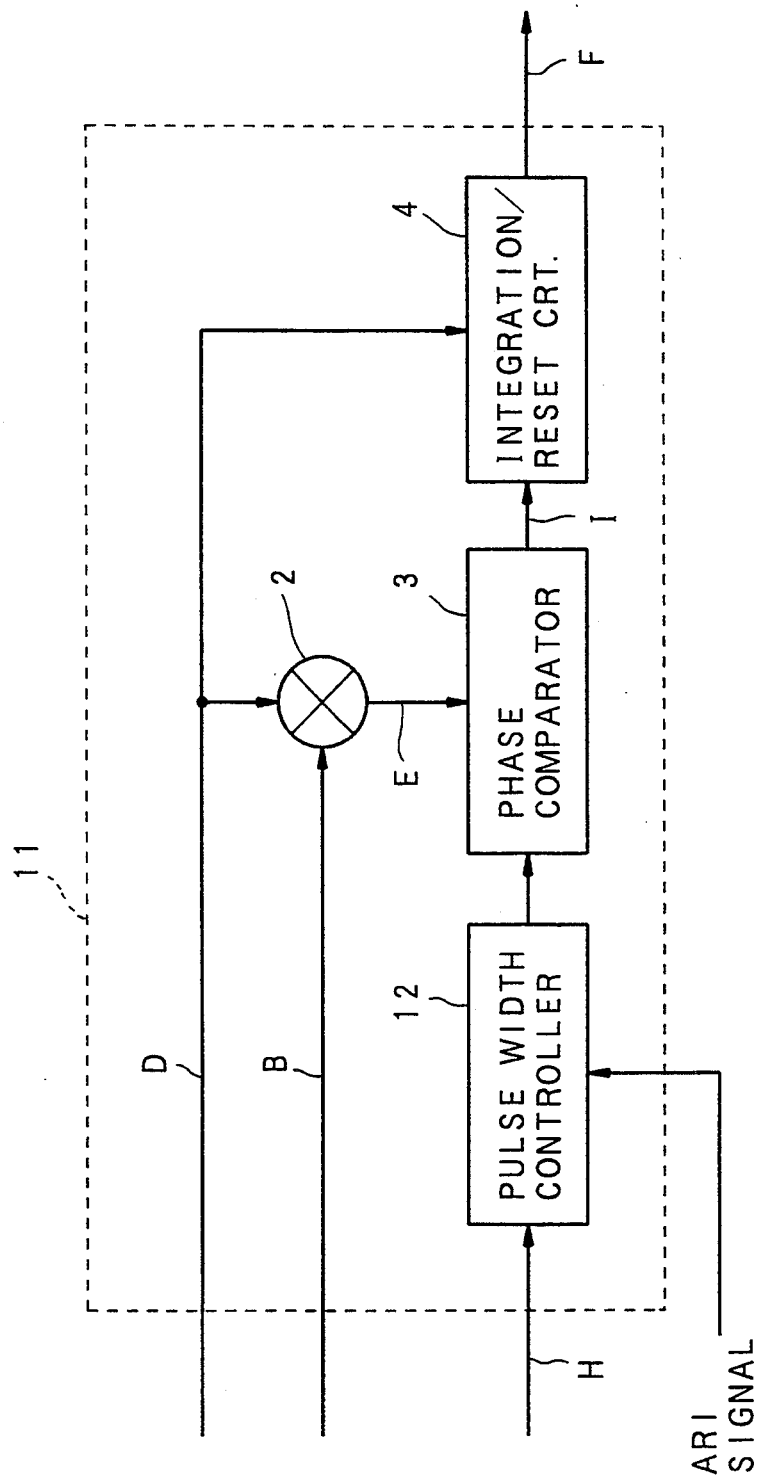
FIG. 7 is a diagram showing another concept of the present invention.

FIG. 6 is a diagram showing a concept of the present invention, and FIG. 7 is a diagram showing another concept of the present invention.

Figure 8:
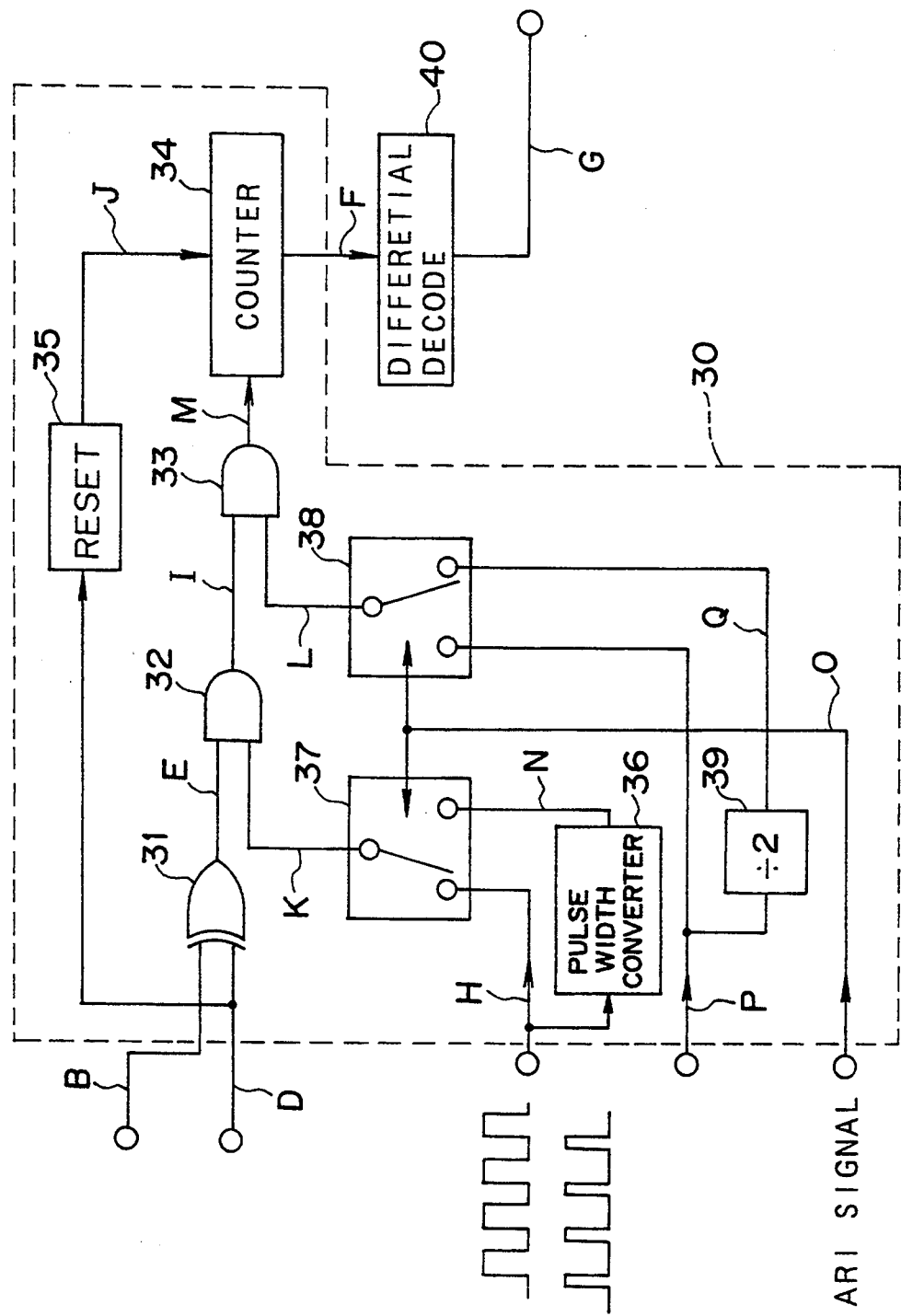
FIG. 8 is a block diagram showing a construction of a bi-phase shift keying signal demodulation circuit according to an embodiment of the present invention.

FIG. 8 shows a bi-phase shift keying signal demodulation circuit according to an embodiment of the present invention. As shown in FIG. 8, the bi-phase shift keying demodulation circuit 30 includes an EX-OR circuit 31, a first AND circuit 32, a second AND circuit 33, a counter 34, a reset circuit 35, a pulse width converter 36, a first switch 37, a second switch 38 and a divider 39. The EX-OR circuit 31 receives the A/D converted RDS modulation signal B and the RDS clock signal D reproduced from the RDS modulation signal B, and calculates an exclusive OR of the two signals to produce the bi-phase shift keying demodulation signal E including the sub-carrier component. The first AND circuit 32 receives the bi-phase shift keying demodulation signal E and the synchronizing signal H of the sub-carrier supplied from the first switch 37, and operates a logical product of them to produce the phase comparison signal I. The second AND circuit 33 receives the phase comparison signal I and the reference clock signal L output from the second switch 38, and operates a logical product of them to output the bi-phase shift keying demodulation signal M indicating the phase relation to the counter 34. The reset circuit 35 receives the RDS clock signal D, and outputs the reset signal J shown in FIG. 9 to the counter 34. The first switch 37 receives the first synchronizing signal H of 57 kHz synchronous with the sub-carrier reproduced by the PLL synchronizing detection, a second synchronizing signal N produced from the first synchronizing signal H and whose pulse width is converted to have a duty cycle of 1:3 by the pulse width converter 36 and an ARI detection signal O. The first switch 37 changes the terminal connection to output the first synchronizing signal H when the ARI signal is not detected and output the second synchronizing signal N when the ARI signal is detected. The second switch 38 receives the first reference clock signal P having the frequency of 4.322 MHz which is a reference signal of the RDS receiver, the second reference clock signal Q having the frequency of 2.166 MHz obtained by dividing the first reference clock P into ½ by the divider 39 and the ARI detection signal O. The second switch 38 changes the terminal connection to output the second reference clock signal Q when the ARI signal is not detected and output the first reference clock signal P when the ARI signal is detected.

FIGS. 9 to 11 show the timing charts of the respective signals shown in FIG. 8. FIG. 9 indicates that the pulses in the phase comparison signal I are converted to the pulses of the reference clock. FIG. 10 shows the pulse conversion in a case where the ARI signal is not detected and the influence of the jitter in the synchronizing detection having occurred. FIG. 11 shows the pulse conversion in a case where the ARI signal is detected and the influence of the jitter in the synchronizing detection having occurred.

As shown in FIG. 9, the phase comparison signal I output from the first AND circuit 32 includes a pulse signal indicating the period in which the phase of the sub-carrier component of the bi-phase shift keying demodulation signal E, output from the EX-OR circuit 32, is inverted. The waveform of the pulse of the signal E is substantially the same as that of the synchronizing signal K, as seen from FIGS. 10 and 11, and the pulse signal is converted by the pulse conversion of the second AND circuit 33 into pulses of the reference clock L having narrower pulse width (i.e., higher frequency). The converted signal is supplied to the counter 34 as the bi-phase shift keying demodulation signal M indicating phase relation. The counter 34 counts the reference clocks output from the second AND circuit 33 for every period of the RDS clock signal responding to the reset signal J, produces an output signal maintaining a high level during a later half period of the RDS clock signal, and supplies it to the differential decode circuit 40 as the bi-phase shift keying demodulation signal F divided for every period. The differential decode circuit 40 reproduces the RDS data G from the bi-phase shift keying demodulation signal F.

As shown in the circles in FIGS. 10 and 11, a count number close to the number of reference pulses within one pulse of the phase comparison signal I is set in the counter 34, and the counter 34 monitors and judges the variation of the phase relation. Accordingly, in a case where the ARI signal is not detected as shown in FIG. 10, erroneous phase judgement is prevented by counting the narrower pulses even if an erroneous pulse is produced in a period of 180 degrees out of phase due to the jitter of synchronizing detection. Further, when the ARI signal is detected as shown in FIG. 11, since the narrower pulses of the synchronizing signal N are supplied to the first AND circuit 32 as the synchronizing signal K of the sub-carrier, the influence of the jitter of the synchronizing detection is absorbed and erroneous phase judgement is prevented. Therefore, the erroneous demodulation of the bi-phase shift keying demodulation signal due to the unstable phase judgement in the counter 34 is prevented.

As described above, according to the bi-phase shift keying signal demodulation circuit of the present invention, the erroneous phase judgement by the integration/reset circuit is prevented by using the narrower pulses even when the phase of the sub-carrier component of the bi-phase shift keying demodulation signal deviates from the phase of the synchronizing signal of the sub-carrier due to the jitter of the synchronizing detection in the RDS receiver. Therefore, an accurate bi-phase shift keying demodulation signal excluding the sub-carrier component is stably produced. Further, the erroneous phase judgement by the integration/reset circuit is prevented by using the pulses whose pulse width is converted even when the phase of the sub-carrier component of the bi-phase shift keying demodulation signal deviates from the phase of the synchronizing signal of the sub-carrier due to the detection of the ARI signal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A bi-phase shift keying signal demodulation circuit for an RDS receiver which receives an RDS modulation signal and reproduces RDS data from the RDS modulation signal, said RDS modulation signal is produced by modulating a sub-carrier by a signal modulated by a bi-phase shift keying modulation using the RDS data, said bi-phase shift keying signal demodulation circuit comprising:
   clock reproducing means for reproducing an RDS clock signal from the RDS modulation signal;
   multiplying means for operating a logical product of the RDS modulation signal and the RDS clock signal;
   phase comparison means for comparing the phase of the output signal of the multiplying means with a synchronizing signal of the sub-carrier and producing a phase comparison signal;
   pulse converting means for converting pulses in the phase comparison signal into pulses of higher frequency than that of the phase comparison signal;
   integration/reset means for monitoring the converted phase comparison signal at every period of the RDS clock signal for phase judgement and producing a bi-phase shift keying demodulation signal from which the sub-carrier component is removed.

2. A circuit according to claim 1, wherein said integration/reset means comprises a counter for counting the number of pulses in the converted phase comparison signal and comparing the number with a preset value for the phase judgement.

3. A circuit according to claim 2, wherein said counter is reset at every period of the RDS clock signal.

4. A circuit according to claim 1, wherein said multiplying means comprises an EX-OR circuit.

5. A circuit according to claim 1, wherein said RDS receiver comprises an ARI detector for discriminating whether an ARI signal is received or not, and said pulse converting means converts the pulses in the phase comparison signal into pulses of a first frequency when the ARI signal is detected and converts the pulses in the phase comparison signal into pulses of a second frequency when the ARI signal is not detected, said second frequency being higher than said first frequency.

6. A bi-phase shift keying signal demodulation circuit for an RDS receiver which receives an RDS modulation signal and reproduces RDS data from the RDS modulation signal, said RDS modulation signal is produced by modulating a sub-carrier by a signal modulated by a bi-phase shift keying modulation using the RDS data, said bi-phase shift keying signal demodulation circuit comprising:
   clock reproducing means for reproducing an RDS clock signal from the RDS modulation signal;
   multiplying means for operating a logical product of the RDS modulation signal and the RDS clock signal;
   phase comparison means for comparing the phase of the output signal of the multiplying means with a synchronizing signal of the sub-carrier and producing a phase comparison signal;
   pulse width varying means for varying pulse width of pulses in the phase comparison signal; and
   integration/reset means for monitoring the phase comparison signal output from the pulse width varying means at every period of the RDS clock signal for phase judgement and producing a bi-phase shift keying demodulation signal from which the sub-carrier component is removed.

7. A circuit according to claim 6, wherein said integration/reset means comprises a counter for counting the number of pulses in the converted phase comparison signal and comparing the number with a preset value for the phase judgement.

8. A circuit according to claim 7, wherein said counter is reset at every period of the RDS clock signal.

9. A circuit according to claim 6, wherein said multiplying means comprises an EX-OR circuit.

10. A circuit according to claim 6, wherein said RDS receiver comprises an ARI detector for discriminating whether an ARI signal is received or not, and said pulse width varying means varies the pulse width of the pulses in the phase comparison signal when the ARI signal is detected by the ARI detecting means.

* * * * *